J. W. BAKER.
BRAKE BEAM.
No. 11,292. Reissued Dec. 6, 1892.
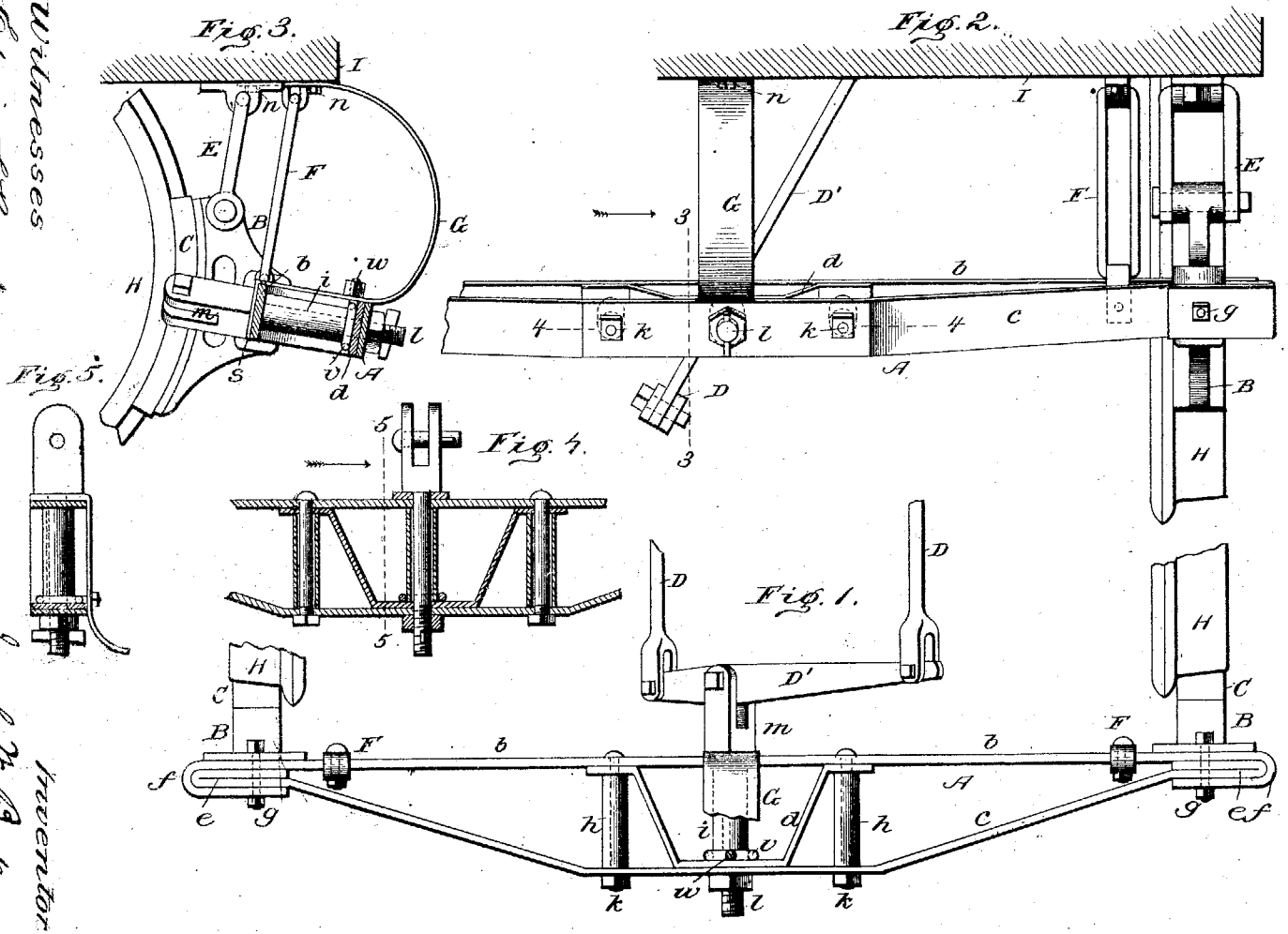
Witnesses
Edwin L. Bradford
Wm. C. Dyer
Inventor
Jacob W. Baker
by F. W. Rutter Jr.
Attorney

UNITED STATES PATENT OFFICE.

JACOB W. BAKER, OF DOVER, NEW JERSEY, ASSIGNOR TO THE NATIONAL HOLLOW BRAKE BEAM COMPANY, OF CHICAGO, ILLINOIS.

BRAKE-BEAM.

SPECIFICATION forming part of Reissued Letters Patent No. 11,292, dated December 6, 1892.

Original No. 438,462, dated October 14, 1890. Application for reissue filed October 12, 1892. Serial No. 448,705.

*To all whom it may concern:*

Be it known that I, JACOB W. BAKER, of Dover, in the county of Morris and State of New Jersey, have invented a new and useful Improvement in Brake-Beams, of which the following is a full, clear, and exact description.

This invention relates to trussed brake-beams for railway-car use; and it consists in a novel construction of the same, and in means connected therewith for holding and securing the spring which relieves or holds back the brake-shoe, substantially as hereinafter described, and more particularly pointed out in the claims.

Reference is to be had to the accompanying drawings, forming a part of this specification, in which similar letters of reference indicate corresponding parts in all the figures.

Figure 1 represents a plan view of my improved brake-beam with pull-rod devices, hangers, brake-heads, shoes thereof, and brake-spring attached, showing the same applied to a pair of a railway car or truck wheels, shown only in part. Fig. 2 is a front elevation of the same, in part, applied to a railway-car-truck body. Fig. 3 is a transverse vertical sectional view upon the line 3 3 in Fig. 2, looking in direction of the arrow therein. Fig. 4 is a sectional view, in part, upon the line 4 4 in Fig. 2; and Fig. 5 is a sectional view upon the line 5 5 in Fig. 4, looking in direction of the arrow therein.

A indicates the trussed brake beam or bar, which is composed of two flat wrought-metal bars *b c*, set edgewise uppermost, the outer or back one *c* being arched or bent to form, in connection with the other or front bar *b*, which is straight, and with the brace-piece *d* at the arch or center of the trussed beam. These bars *b c* are not welded to each other at their ends, but are doubled over or bent at such parts, the bar *c* upon itself, as at *e*, and the bar *b* doubled over, as at *f*, to receive within it the doubled-over ends of the bar *c*, after which bolts *g* are inserted to firmly clamp the doubled-over ends of the two bars together, which bolts may also be used to secure the brake blocks or heads B, holding the shoes C to the brake-beam. This forms a very simple and strong construction of the brake-beam at its ends and provides for its ready substitution for the ordinary wooden brake-beam to be used in connection with the standard brake-heads, as adopted by the Master Car Builders' Association of the United States. The trussed brake-beam A is further stiffened or supported at its center, and the brace or arch piece *d* united therewith by tubular stays *h h* and *i*, and bolts passing through said tubular stays and through the bars *b c* of the brake-beam. Thus the tubes *h h* are arranged between the beam-bar *c* and side flanges on the arch-brace *d*, and the bolts *k k* passed through said tubes, the flanges on the arch-brace *d* and the bars *b c*, while the center tube *i* is arranged between the bar *b* and the back of the arch-brace *d*, and the bolt *l*, which has the usual jaw-head *m* for connection therewith of the pull-rod mechanism D D′ of the brake, passes through said tube *i*, arch-brace *d*, and bars *b c* of the beam. All of these bolts *k k l* are of course adjustable to tighten up their hold.

E and F indicate the usual or any suitable brake-hangers, and G is the spring which keeps the brake-shoes clear of the truck-wheels H H when the brake is not drawn or forced onto them. This spring, which is of approximately C form and adjustable, is secured at its top to the car-truck body I, as by bolts *n*, and is arranged below to lie on top of the brake-beam A, with its forward lower end *s* bent down to lap over or against the front side of the bar *b* of the beam, and the bolt *l*, which thus has a double function, passes through said bent end *s*, and clamps it by the jaw-head *m* tightly against the bar *b* of the beam. Said spring G is further secured at its base to the top of the brake-beam by a circular clip *v*, arranged around the tubular stay *i* next to the back of the arch brace-piece *d*, and provided with an integral screw-stud *w*, which passes through the spring and is tightened up by a nut on the outside. Thus the spring G is firmly held to its position on the brake-beam both back and front.

Having thus fully described my invention, I claim as new and desire to secure by Letters Patent—

1. The combination, in a trussed brake-beam, of an arched back bar and a front bar, the ends of one of said bars doubled over the other of said bars, and fastenings for clamping the ends of both bars together, substantially as and for the purposes specified.

2. The trussed brake-beam, composed of an arched back bar, a front bar having its ends doubled over the ends of the arched bar, and fastenings clamping the doubled ends of both bars together, substantially as specified.

3. The trussed brake-beam, composed of an arched back bar doubled over upon itself at its ends, a front bar having its ends doubled over the folded ends of the arched bar, and fastenings clamping the doubled ends of both bars together, substantially as specified.

4. The combination of the arched back bar and front bar of the beam having their ends engaged with one another, as described, bolts uniting said independent bars at their ends, a center-arch brace-piece between the bars, and tubular stays and bolts passing through said stays uniting the back and front bars of the beam and arch-brace piece together, essentially as described.

5. The combination, with the brake-beam, of the spring G, arranged to lie on top of said beam and having its base constructed with a bent lower extremity *s*, adapted to lie over or against the front of the brake-beam, and the bolt *l*, with its jaw-head *m* arranged to clamp said bent end of the spring to the beam, substantially as specified.

6. In combination with the brake-beam, and the spring G, having its base end constructed to lap over the front of the beam, the clip *v*, applied to said beam and provided with a stud *w*, arranged to pass through the rear portion of the spring and adapted to be secured on the inner side thereof, essentially as specified.

JACOB W. BAKER.

Witnesses:
F. W. RITTER, Jr.,
GUY H. SEGUR.